US008516037B2

(12) United States Patent
Beisiegel et al.

(10) Patent No.: US 8,516,037 B2
(45) Date of Patent: Aug. 20, 2013

(54) METHODS FOR DYNAMIC PARTITIONING OF APPLICATIONS IN CLIENT-SERVER ENVIRONMENTS

(75) Inventors: Michael Beisiegel, Poughkeepsie, NY (US); Judah M. Diament, Bergenfield, NJ (US); Avraham Leff, Spring Valley, NY (US); Thomas A. Mikalsen, Cold Spring, NY (US); James T. Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/139,688

(22) Filed: Jun. 16, 2008

(65) Prior Publication Data

US 2009/0313319 A1 Dec. 17, 2009

(51) Int. Cl.
*G06F 15/16* (2006.01)
(52) U.S. Cl.
USPC .............................. 709/203; 709/201; 709/202
(58) Field of Classification Search
USPC ................................ 709/202, 203; 715/700
See application file for complete search history.

(56) References Cited

U.S. PATENT DOCUMENTS

| 6,674,450 | B1 | 1/2004 | Toub et al. | |
|---|---|---|---|---|
| 6,901,595 | B2* | 5/2005 | Mukundan et al. | 719/316 |
| 6,950,850 | B1* | 9/2005 | Leff et al. | 709/203 |
| 6,978,452 | B2* | 12/2005 | Oesterreicher et al. | 717/171 |
| 2003/0074634 | A1* | 4/2003 | Emmelmann | 715/513 |
| 2005/0132323 | A1* | 6/2005 | Huerta et al. | 717/100 |
| 2006/0053163 | A1* | 3/2006 | Liu et al. | 707/104.1 |
| 2006/0080389 | A1 | 4/2006 | Powers et al. | |
| 2006/0184626 | A1 | 8/2006 | Agapi et al. | |
| 2006/0212514 | A1* | 9/2006 | Saillet | 709/203 |
| 2007/0043831 | A1* | 2/2007 | Kessler et al. | 709/219 |

FOREIGN PATENT DOCUMENTS

JP 2002189600 7/2002

OTHER PUBLICATIONS

Abstract of JP2002189600.
Lewandowski, Scott M., "Frameworks for Component-Based Client/Server Computing," ACM Computing Surveys, vol. 30, No. 1, Mar. 1998.
Ramamurthy, Pratap, et al., "Using Mini-Flash Crowds to Infer Resource Constraints in Remote Web Servers," INM '07, pp. 250-255, Aug. 2007.
Zhang, Li, "Supporting Virtual Documents in Just-in-Time Hypermedia Systems," DocEng '04, Oct. 2004, pp. 35-44.
Microsoft Live Labs : Volta, http://labs.live.com/volta/, printed on Apr. 4, 2008.
International Search Report and Written Opinion for PCT/US09/46831.

* cited by examiner

*Primary Examiner* — Umar Cheema
(74) *Attorney, Agent, or Firm* — Cahn & Samuels, LLP (57) ABSTRACT

A method for dynamically deploying an application in a client-server environment includes evaluating at least one constraint of at least one of the application or the client-server environment and partitioning the placement and execution of components of the application in the client-server environment dynamically at runtime according to the at least one constraint.

15 Claims, 7 Drawing Sheets

```
<application xmlns="http://www.ibm.com/xmlns/jitss/1.0/">
    <scope name="AccountsUI" operations="..." references="AccountsManagement">
        <script type="text/javascript" >
        ...
        AccountsManagment.transferFunds(...);
        ...
        </script>
    </scope >

<scope name="AccountsManagement"
        operations="transferFunds" references="AccountsX AccountsY">
        <script type="text/javascript">
        function transferFunds(fromX,toY,amount)
        {
            adjustAccount(AccountsX, fromX, -amount);
            adjustAccount(AccountsY, toY, amount);
        }
        function adjustAccount(resource,accountNum,amount)
        {
            var account = resource.get(accountNum);
            account.balance += amount;
            resource.put(accountNum,account);
        }
        </script>
        <constraint.transactional/>
    </scope>

<resource name="AccountsX" type="application/json" />
    <resource name="AccountsY" type="application/json" />
</application>
```

METHODS FOR DYNAMIC PARTITIONING OF APPLICATIONS IN CLIENT-SERVER ENVIRONMENTS

I. FIELD OF THE INVENTION

This invention relates to a system and method for dynamic partitioning of an application in a client-server environment so that at runtime part of the application may automatically execute on a server and part of the application may automatically execute on a client.

II. BACKGROUND OF THE INVENTION

In general, for Web 1.0 applications, a client-side (e.g., browser) is restricted to rendering and presentation. Logic that executes on the client, if any, is used to support a particular view. All controller logic executes on the server-side, and all model manipulation occurs on the server-side. This so-called "thin-client" approach provides for static client/server partitioning. Although there are client-specific programming models (e.g., HTML/JavaScript) and server-side specific programming models (e.g., Java Servlet), the partitioning between client and server is well defined.

The downside of the thin-client approach is the end-user experience. It is not as engaging as a traditional rich-client approach. Further, the client-side is continually posting and reloading full pages from the server-side, i.e., the client has no autonomy. Since all of the substantive work happens on the server, the approach does not leverage the computer power of client platforms.

So-called Web 2.0 applications attempt to address these problems by broadening the role of the client. However, there are several problems with the Web 2.0 approach. Application development includes "tuning" any partitioning between client and server. Thus, what is client-side and what is server-side is no longer well defined. A given application partitioning (client vs. server) may be appropriate for one device (e.g., browser running on a PC) but not another (e.g., browser running on a cell phone). In particular, regarding enterprise data, a given client may not provide the same Quality of Service (with respect to execution of application code) as the server. There are also issues of trusting that the application code running on the client has not been altered and of providing reliability guarantees, in particular, transaction semantics, for application logic.

The next generation of software applications, such as Web 2.0 applications, is primarily client-side applications. Yet, there are often requirements that cannot be satisfied in a client alone. Such requirements, typically non-functional requirements, may include data sharing, security, reliability, privacy, and memory constraints. To satisfy these requirements, some application logic needs to run on a server.

To satisfy such requirements, applications are implemented using explicit server-side programming models and require special treatment during deployment. This traditional approach imposes a tight coupling of functional and non-functional concerns. Developers are forced to implement their applications in terms of different models (client-side vs. server-side), making it difficult to evolve the implementation as requirements emerge and change. This approach thus stresses both the skills and budgets of application developers.

Accordingly, there remains a need to simplify the development of applications for a client-server environment such that separate programming models for a server and a client are not required. There is also a need for applications that are implemented with flexibility as to where application components may be executed at runtime.

There is a need for a programming model that is client/server agnostic, allowing for automated, just-in-time partitioning of an application based on the specific client-side capabilities of individual users of an application.

III. SUMMARY OF THE INVENTION

According to the present invention a method for dynamically deploying an application in a client-server environment is provided. At least one constraint of at least one of the application or the client-server environment is evaluated. The placement and execution of components of the application are partitioned in the client-server environment dynamically at runtime according to the at least one constraint.

According to another aspect of the invention, a method for dynamic deployment of an application in a client-server environment is provided. At least one constraint is evaluated comprising (a) system, device, or network capabilities and/or (b) a non-functional or quality-of-service requirement for at least one application component. At runtime, the application is automatically partitioned into at least one client-side subset and at least one server-side subset according to the at least one constraint.

According to another aspect of the present invention, a system for dynamically deploying an application in a client-server environment is provided. The system comprises at least one client; at least one server; and an agent for automatically partitioning an application into at least one of a client-side subset, a server-side subset, or a combination thereof according to at least one constraint at runtime of the application.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

V. DETAILED DESCRIPTION OF THE DRAWINGS

FIGS. 1-5 illustrate a system and method for the development and automatic dynamic deployment of an application for a client-server environment. Although the following discussion is focused primarily on a web application in a server-browser environment, the present invention may be employed in other client-server environments, for example, database technology environments that use explicit client-side (e.g., JDBC) and server-side (e.g., stored procedures) programming and deployment models.

According to the present invention, a developer creates an application using a single programming model, for example, by developing an entire web application as if it will run entirely on a client (e.g., browser), thereby obviating the need for a distinct server-side programming and deployment model. Application logic is independent of its eventual placement on a server or a client. At runtime, part of the web application will automatically execute on at least one server, at least one client, or both.

I. Application Components

According to the present invention, a web application is developed comprising at least one application component. The at least one application component may comprise at least one computational component called a scope; at least one data component called a resource; or any combination of computational and data components.

The at least one computational component (scope) comprises application logic and related code representing at least one computational aspect of a web application. In embodiments, a computational aspect is a function of the underlying application and manipulates a state of the application. In other embodiments, the computational aspect may not change the state of an application, for example, it may comprise an algorithm such as a graphics rendering algorithm. A computational aspect may include, but is not limited to, validating forms, accessing a database, managing queries, calling services, conducting transactions, graphic transformations, image processing, calculations, spell checker, syntax highlighting, interaction with user interface components, or the like. A scope may reference another scope.

The at least one data component (resource) comprises application data representing a state of a web application. In embodiments, a resource may comprise a searchable collection of data or objects. Such data or objects may include, but are not limited to, submitted orders; a database (e.g., an employee database, a database defining relationship between data); a collection of image files, music files, or documents; a file that needs to be stored persistently, or the like. According to the present invention, a resource may be shared by different scopes.

The web application comprises at least one constraint. The at least one constraint is used to communicate extra-functional semantics of an application, where the specific code used to implement a given constraint depends on the context in which the application is being used at runtime. The context may include, for example, at least one of the capabilities of a client device, identity of the user, development mode vs. production mode, or the like. The system evaluates the runtime context and places the scope and/or resource on the client or the server (or both) where an appropriate implementation of the at least one constraint can be provided.

In embodiments, the at least one constraint may be a hard constraint which depends on the environment where a scope or resource may be run, for example, system, device, or network capabilities; client version; or memory constraints. A hard constraint is not associated with the web application.

In embodiments, a constraint may be an abstract constraint, in which the system automatically decides at runtime where to run a scope or resource based on a developer's specified non-functional and/or QoS requirements for a scope or a resource. The non-functional and/or QoS requirements may comprise at least one requirement including, but not limited to, data sharing, security, reliability, privacy, trusted code, confidentiality, or user identity.

An application according to the present invention may have at least one of a hard constraint, an abstract constraint, or any combination thereof.

The at least one constraint may be expressed external to application logic and is not encoded directly in a scope or resource. Thus, the at least one constraint represents implementation code that has been factored out of the application. However, in embodiments, the at least one constraint may be integrated with or implied by code. For example, the use of (or dependency on) a transaction demarcation API can imply an atomic execution transaction constraint or, in a Java programming language, a Java class might import and use an interface which could imply a transaction constraint.

II. Partitioning Of Application

According to the present invention, the at least one constraint is evaluated and causes the partitioning of a web application at runtime and placement and execution of the at least one application component (scope and/or resource). The at least one constraint may be applied per use of the web application, so that placement and execution of the at least one scope, at least one resource, or combination thereof may vary in different client-server environments.

In embodiments, the application may be partitioned into at least one client-side subset, at least one server-side subset, or both a client-side subset and a server-side subset. The subsets may or may not disjoint. Actual placement of the at least one component (scope and/or resource) on at least one server, at least one client, or both at runtime of the web application is determined by the at least one constraint. According to the present invention, multiple sessions of a web application may share a scope or resource. Alternatively, each session may have its own copy of a scope or resource. A scope or resource may be limited to a single web application session. In embodiments, a scope or resource may be defined to be strictly client-side or strictly server-side.

Figure 1:
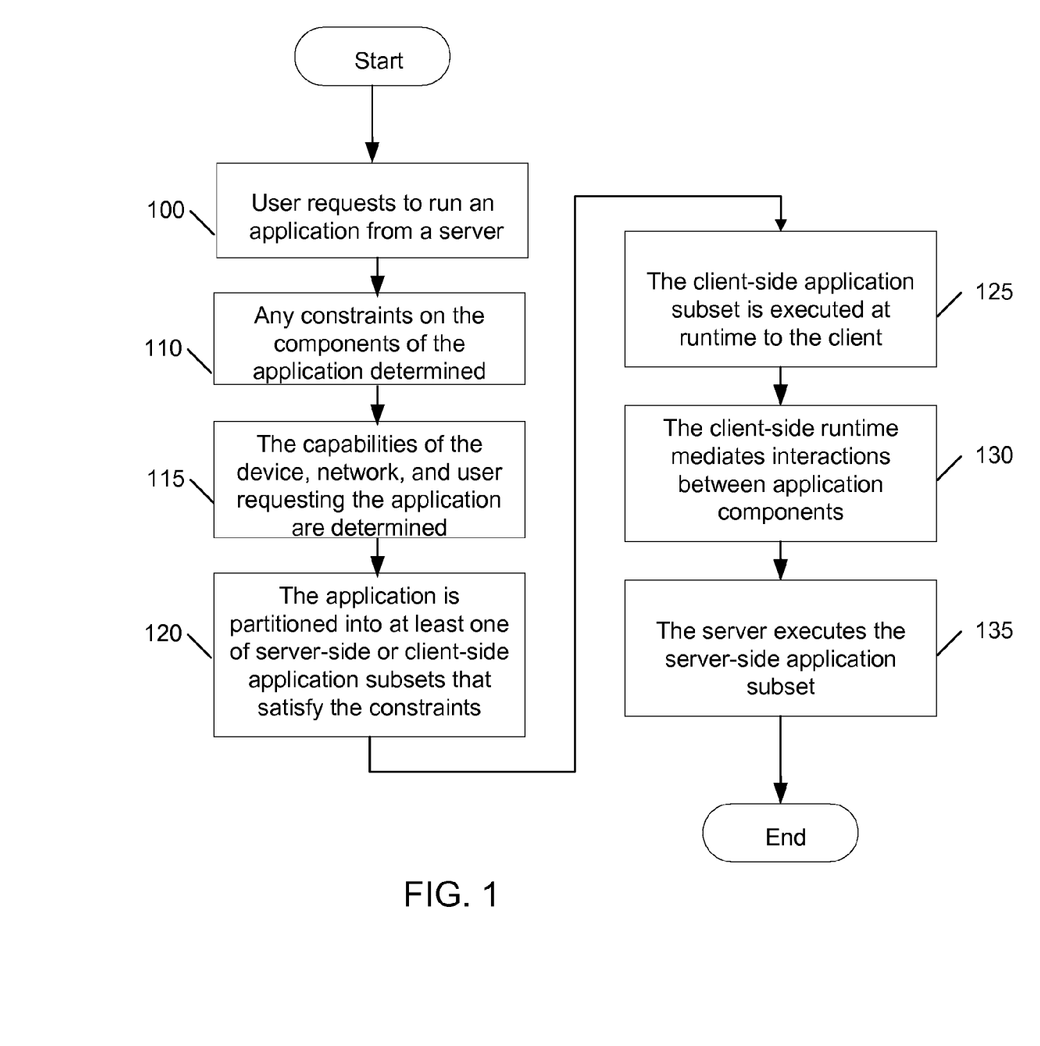
FIG. 1 illustrates a flowchart for automatically partitioning an application in a client-server environment according to an embodiment of the present invention.

FIG. 1 illustrates a method of the partitioning of a web application according to an embodiment of the present invention. A user requests to run an application from a server 100. Any constraints (abstract constraints) on the components (scopes and resources) of the application 110 are determined. The capabilities (hard constraints) of at least one of the device, network, and user requesting the application 115 are determined. The application is automatically partitioned into at least one of server-side or client-side application subsets that satisfy the constraints 120. The client-side application subset is executed at runtime by the client on the device 125. The client-side runtime mediates interactions between application components 130 (e.g., middleware mediates interactions between scopes and resources). The server executes the server-side application subset 135.

III. Examples

Examples of automatically partitioning and deploying an application into server-side and client-side parts at runtime according to the present invention will now be discussed.

A. Reliability

According to the present invention, a web application may be partitioned based upon a reliability constraint. The placement and execution of the at least one application component is determined at runtime and may vary depending upon reliability attributes of a device, system or network (hard constraint) and/or on a non-functional requirement of the developer (abstract constraint). For example, a scope may have a requirement that operations within the scope execute as an atomic unit, despite any failures that may occur as the operations execute. The operations wholly succeed or wholly fail. Accordingly, a scope with such a constraint may be executed on the server where atomic execution can be guaranteed.

Applications in which reliability is important may include, for example, conducting transactions or reliable messaging. In embodiments, if one application messages or calls another application, a reliability constraint may be to guarantee delivery if the system fails. Consequently, message queuing may occur on a server to eliminate delivery failures or duplicate processing of delivery requests by a web browser.

Figure 2A:
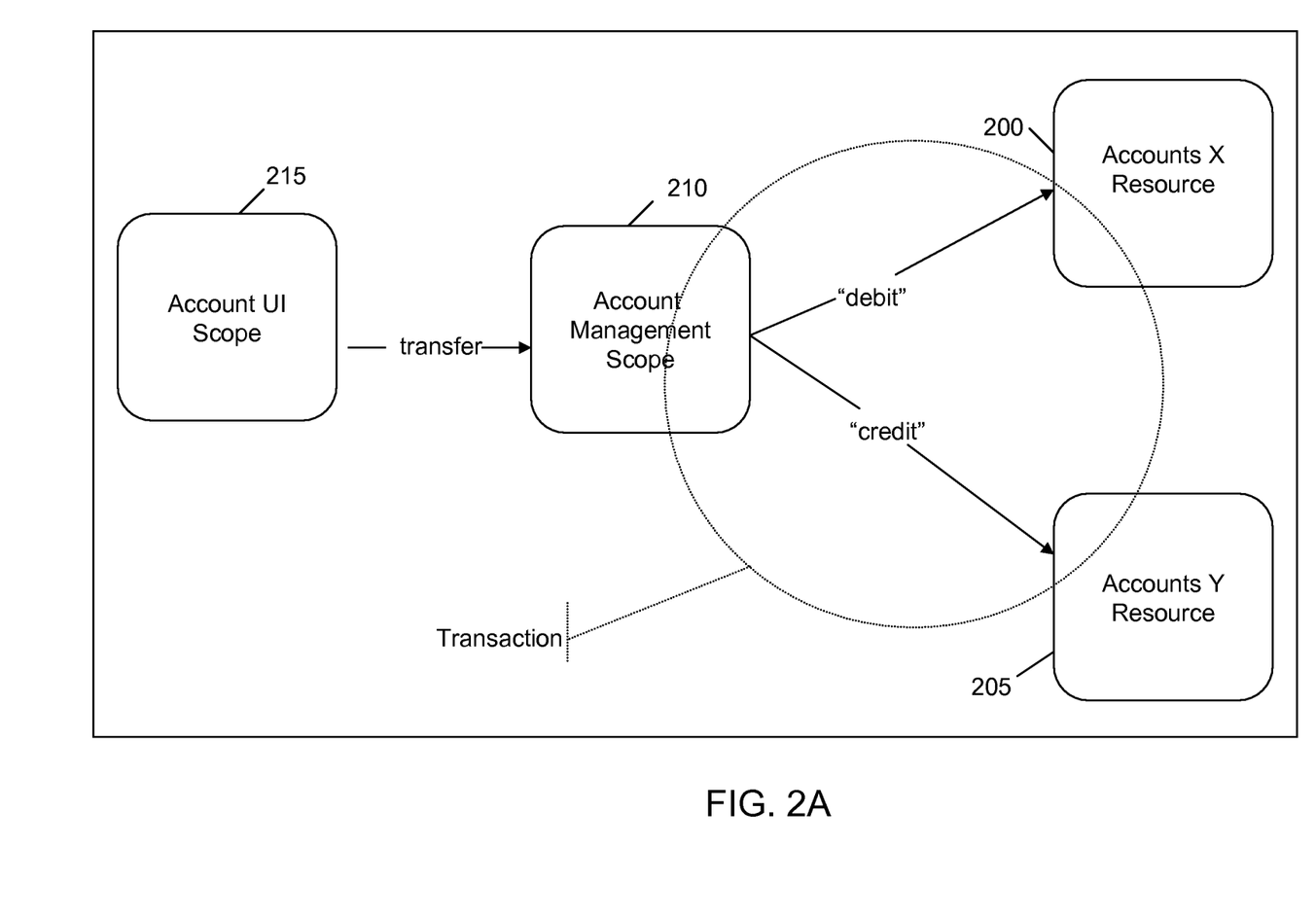
FIG. 2A illustrates an example of a transaction web application according to an embodiment of the present invention.
Figure 2B:
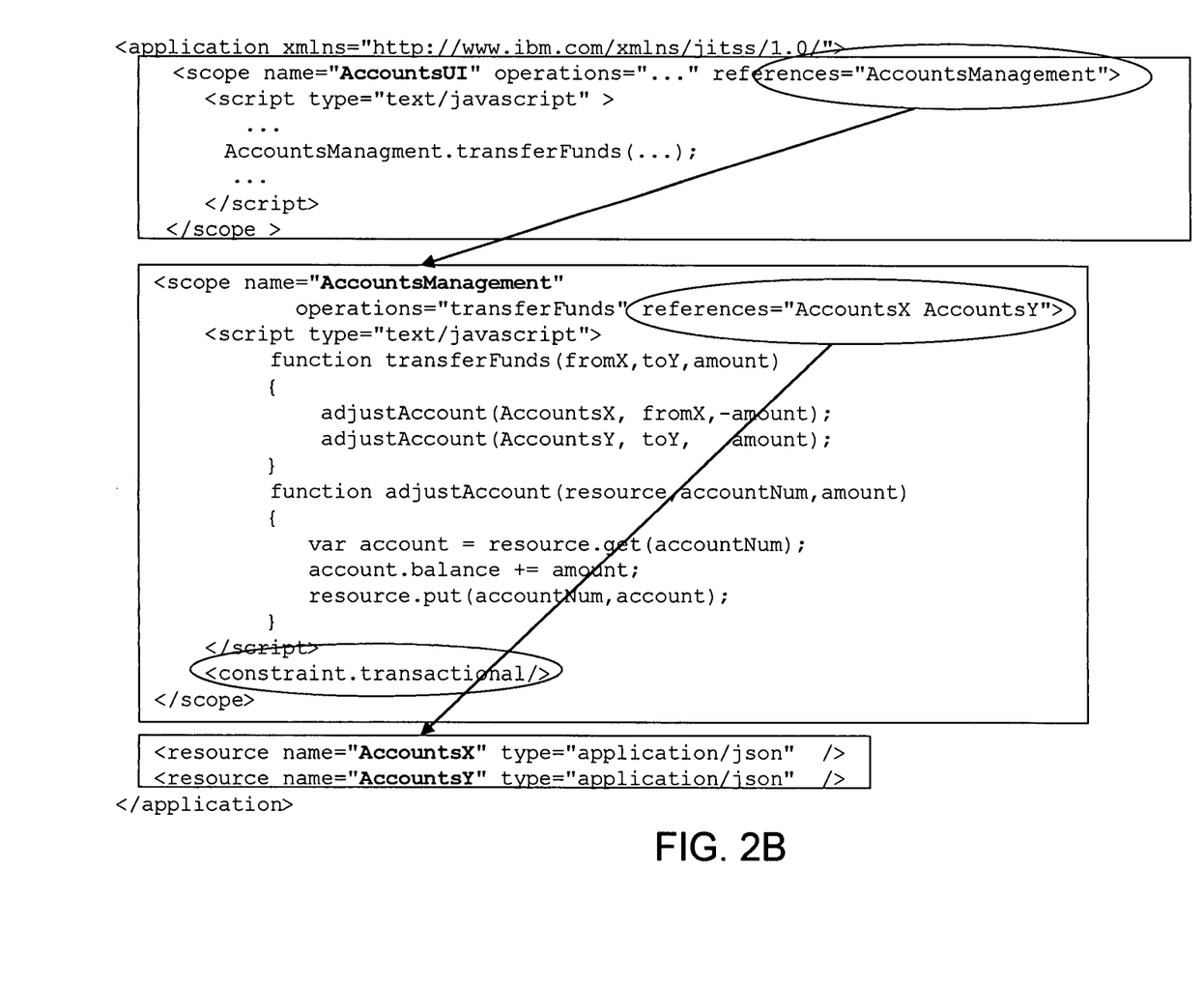
FIG. 2B illustrates an exemplary implementation of the transaction web application of FIG. 2A.

FIGS. 2A-3B illustrate development and runtime deployment of a transactional application having a reliability constraint according to an embodiment of the present invention. As shown in FIG. 2A, a transactional application is directed to debits and credits between Accounts X Resource 200 and Accounts Y Resource 205 and an Account Management Scope 210. The transaction occurs upon a user requesting a transfer of credit or debit from an Account User Interface Scope 215. Implementation of the transaction application of FIG. 2A in Just-in-Time Server Side Components or JTISS code (e.g., XML) is shown in FIG. 2B.

Figure 3A:
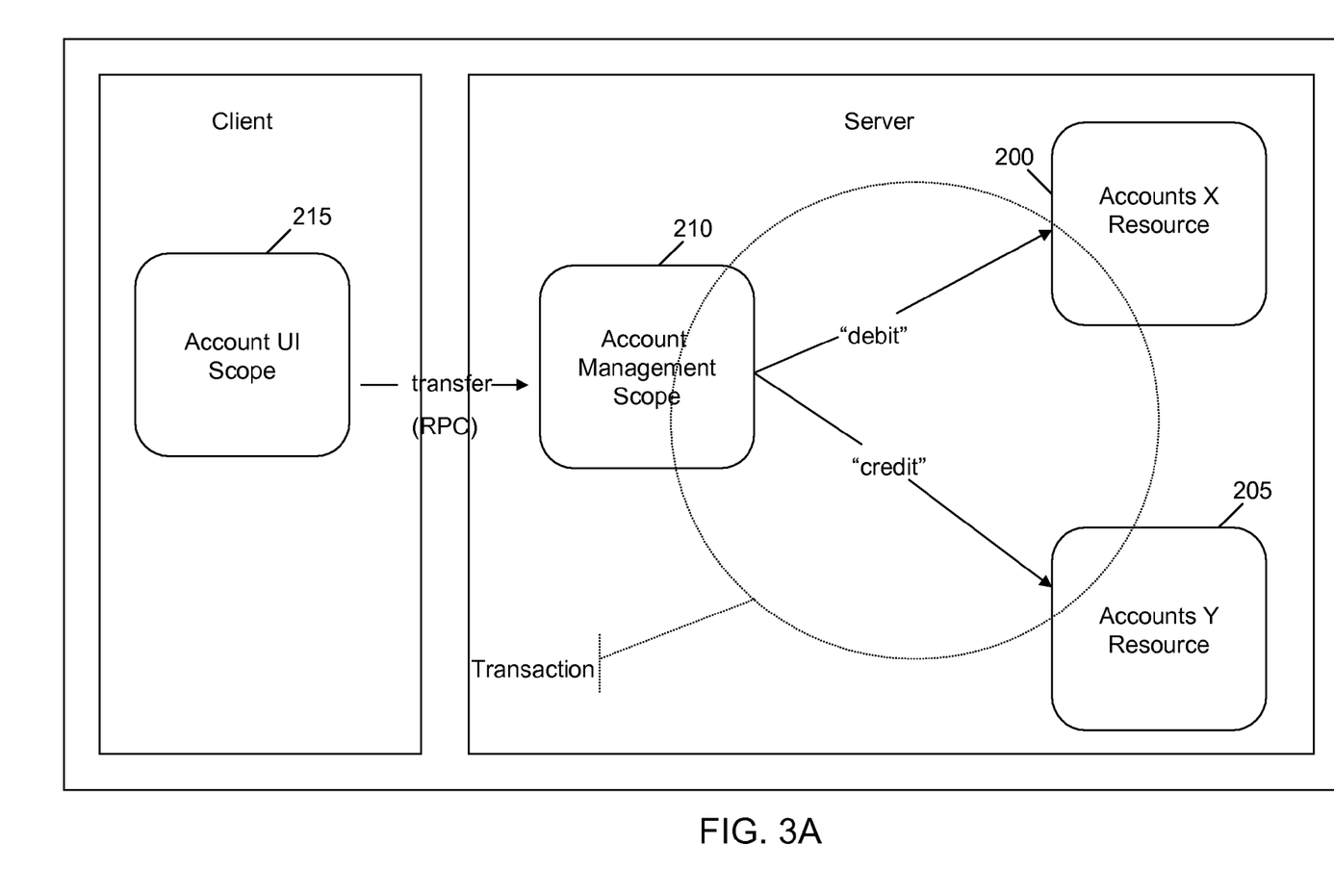
FIG. 3A illustrates an example of runtime partitioning of the transaction web application of FIG. 2A.
Figure 3B:
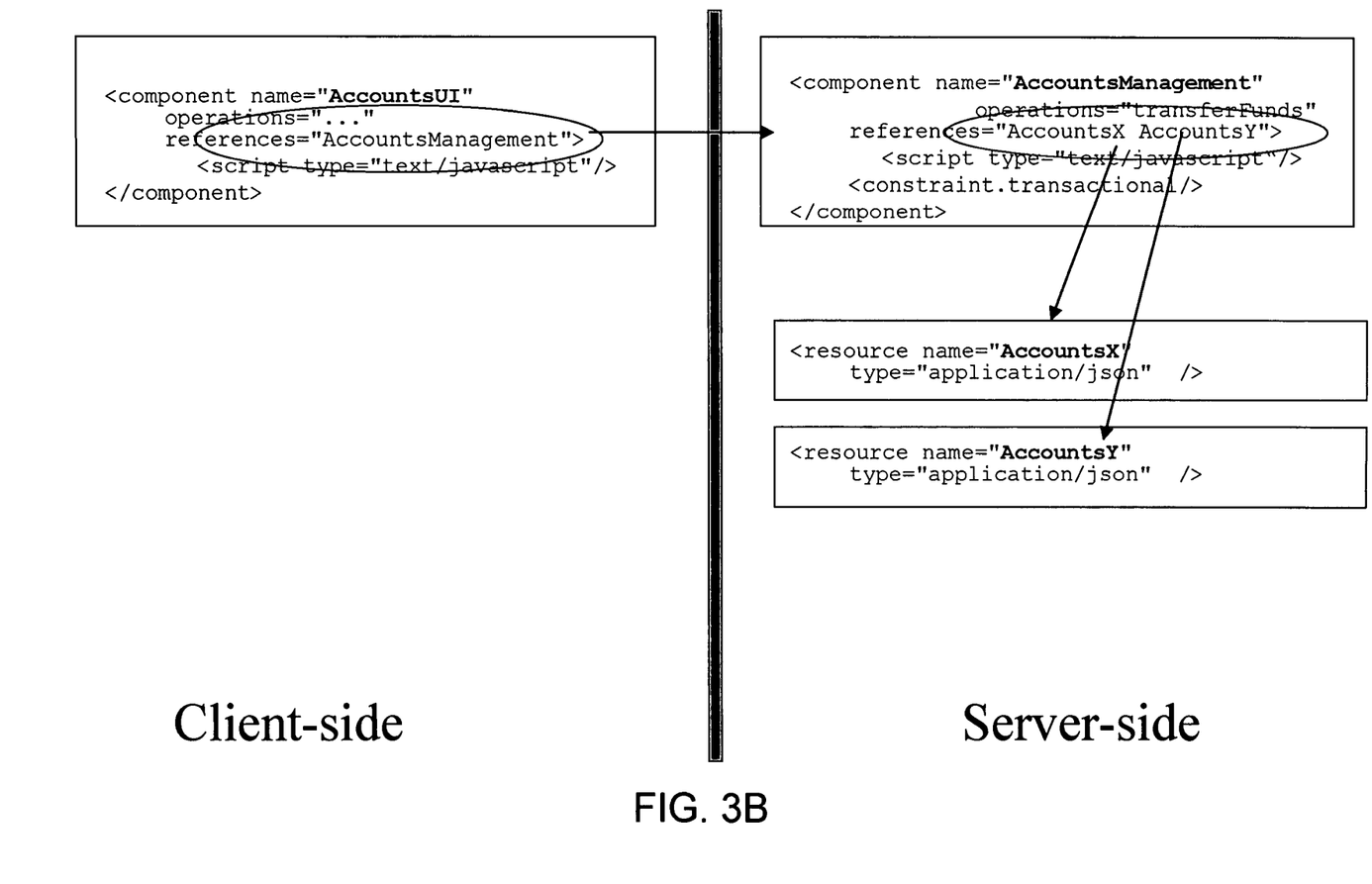
FIG. 3B illustrates an exemplary implementation of runtime partitioning of FIG. 3A.

At runtime as shown in FIG. 3A, the Account Management Scope 210 and Accounts X and Y Resources are automatically placed and executed on the server, while the Account User Interface Scope 215 is placed and executed on the client web browser. The constraint requires reliable transfer of debit and credit information and therefore the Accounts X and Y Resources and Account Management Scope are executed on the server. The Account UI Scope is executed on the client web browser. Implementation of the runtime partitioning of the application is shown in FIG. 3B.

B. Footprint

A web application developed according to the present invention may be utilized to redistribute or reduce a client-side footprint. Many applications (e.g., enterprise applications) include protocols and middleware that require libraries having additional code and memory. Examples of applications that execute such libraries include, but are not limited to, Simple Object Access Protocol (SOAP) or Java Message Service (JMS).

The size and memory requirements of these libraries are a hard constraint which affects where application components may be executed according to the present invention. For example, for a client running on a personal computer system having a large amount of memory, protocols and middleware requiring libraries may be executed on the client. However, for a client running on mobile devices (e.g., cell phone), the same application components that utilize such libraries may be executed on a server.

C. Cross-Domain Requests

A web application developed according to the present invention may support cross-domain requests. For example, a client web browser may have security restrictions so that it can only communicate with the server that provided the code (origin server). However, composite applications (e.g., groups of applications) comprise applications that are not always running on the same server, the same device, or the same network. Consequently, a client-side security policy may prevent interaction between applications.

According to the present invention, an application component (e.g., scope or resource) trying to interact with a client may be forced to run on a server. This feature is important as many web applications, for example mash-up applications, need to get around security walls.

D. Privacy

According to the present invention, a web application may comprise a constraint comprising at least one privacy requirement. The at least one privacy requirement may comprise sensitive information including, but are not limited to, passwords, user names, financial information, or proprietary information.

At runtime, the application is preferably partitioned so that any sensitive application logic/data stays on a server. Thus, the present invention allows a web application to run in a secure environment. In embodiments, an application may provide a confidentiality guarantee as a result of the partitioning.

E. Trusted Code

According to an embodiment of the present invention, a web application may require that trusted code run in a trusted environment. For example, an application component that accesses a database may include trusted code that is allowed to directly access a database. As such, there is a constraint that requires the system to guarantee that this component containing the trusted code is not altered. Depending on the runtime context, this security/trusted code constraint may require that the application component execute in a trusted environment (such as a server).

Traditionally, developers must utilize different code and programming models for the trusted code. However, the present invention allows a developer to provide a web application using a single programming model as if will run entirely on a client.

F. Consistency

According to the present invention, at least one constraint may be used to specify varying levels of data consistency associated with a resource. For example, a high-consistency constraint may cause a resource that is accessed by multiple clients to be placed on a server. A low-consistency constraint may allow the resource to run on a client, resulting in better performance.

G. Heterogeneous Implementations

According to the present invention, deployment of heterogeneous web application is simplified. A heterogeneous web application may comprise a mixture of different programming languages, for example, at least two different programming languages. For example, Java code may run on the server, whereas JavaScript may run on a client.

In embodiments of the present invention, a web application is partitioned at runtime according to at least one hard constraint of the system, device, or network so that application components will run on at least one server and/or at least one client that support the appropriate programming language. For example, an application according to the present invention may allow Java code to run on a client as well as on a server.

According to the present invention, web application components (scopes, resources, and constraints) may be described using a programming model. In embodiments, the components may be described in at least one of XML (Extensible Markup Language) or JavaScript.

IV. System

Figure 4:
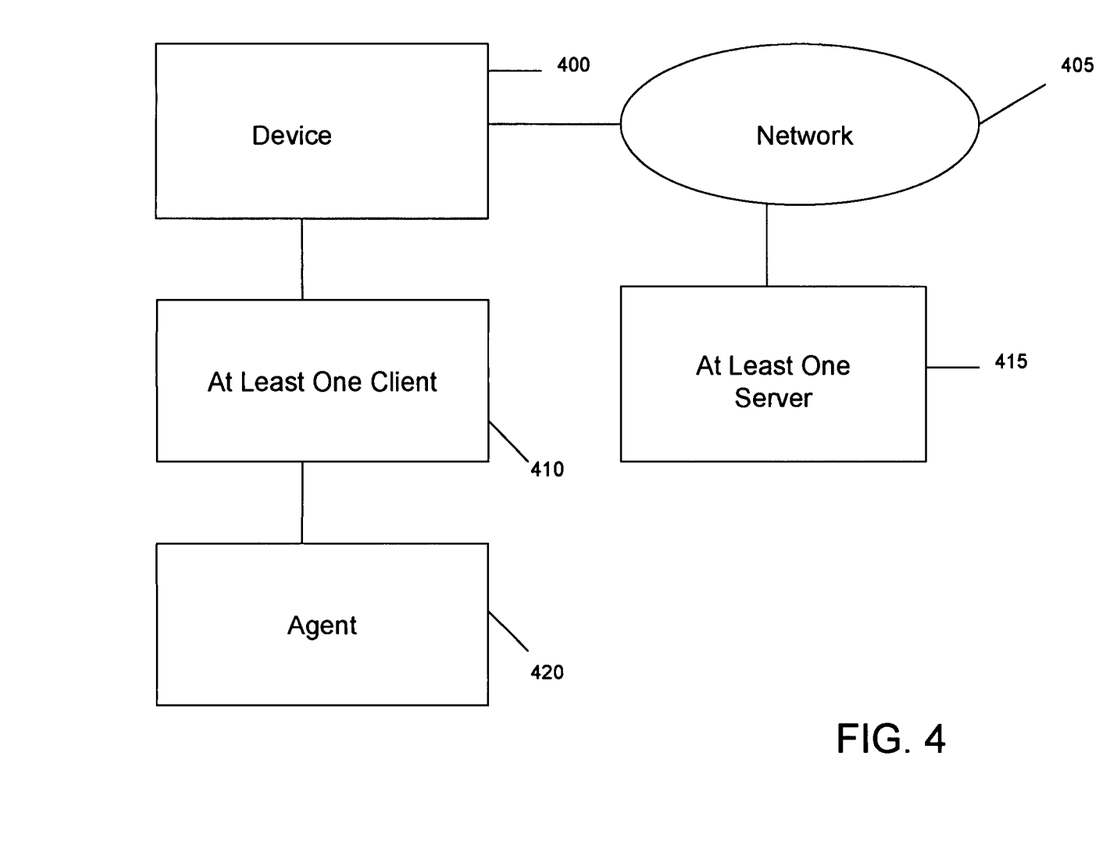
FIG. 4 is a block diagram of a system according to the present invention.

FIG. 4 is a block diagram showing an illustrative system of the invention. The illustrative system includes at least one electronic or digital device 400 (e.g., a personal computer, cellular telephone, personal digital assistant or PDA, game device, MP3 player, television). The device may be connected to a network 405 (e.g., the Internet, local area network (LAN), wide area network (WAN)). In embodiments of the invention, the system includes at least one client 410, an agent 420, and at least one server 415 for executing a server-client application. The agent 420 automatically partitions an application into at least one of a client-side subset, a server-side subset, or a combination thereof according to at least one constraint at runtime of the application In embodiments, the at least one server may be at least one of a web server; an extension to a web server; or a Java servlet container. In embodiments, the at least one client may be at least one of a web browser; a standalone JavaScript engine; or an embedded JavaScript engine. The illustrative system of FIG. 4 is but one example, and one of ordinary skill in the art would recognize that many other variations may exist, all of which are contemplated by the invention.

Figure 5:
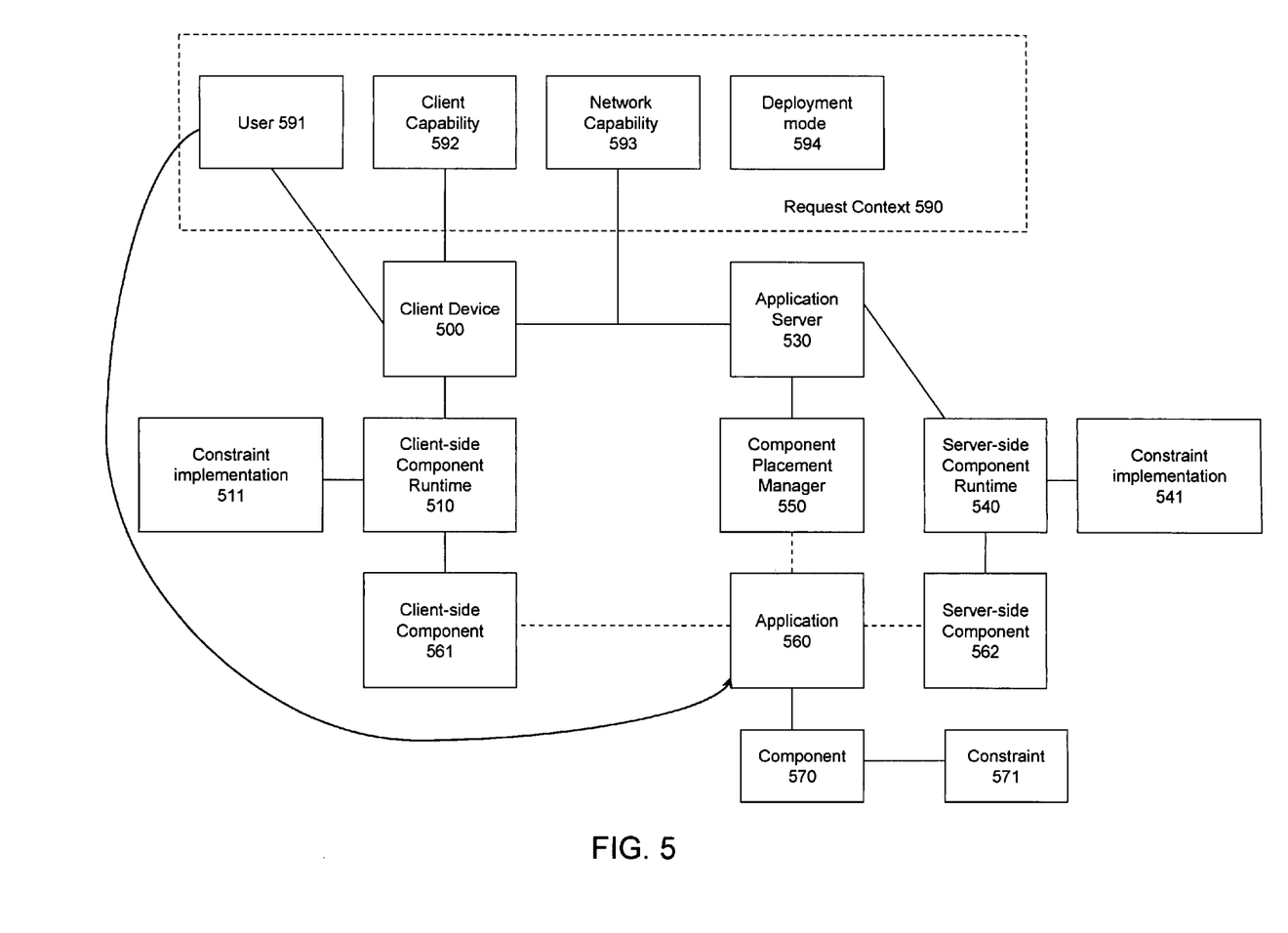
FIG. 5 is a detailed block diagram of a system according to an embodiment of the present invention.

FIG. 5 illustrates a more detailed block diagram of a system and operation thereof according to an embodiment of the present invention. Using a client device 500, a user 591 requests an application 560 through an application server 530. The application 560 comprises at least one application component 570 and at least one constraint 571.

The user request occurs within a request context 590. This request context 590 can include the capabilities of the client device 592, the identity of the user 591, and a deployment mode 594. For example, a deployment mode can include "stand-alone testing" and "production."

At runtime, a Component Placement Manager 550 evaluates the context 590. The application component constraint 571 and constraint implementations for the client (511) and sever (541) partition the application 560 into a subset of client-side components 561 and a subset of server-side components 562 such that the all constraints are satisfied.

The application server 530 delivers zero or more client-side component runtimes 510 and the set of client-side application components 561 to the client device 500. The client-side component runtimes provide execution environments for client-side components, including appropriate constraint implementations 511 suitable for client-side execution.

The application server 530 provisions zero or more server-side component runtime 540 to execute server-side components 562. The server-side component runtimes provide execution environments for server-side components, including appropriate constraint implementations 541 suitable for server-side execution.

When a client-side component 561 needs to communicate with another client-side component 561, the client-side component runtimes 510 mediate the communication. When a server-side component 562 needs to communicate with another server-side component 562, the server-side component runtimes 540 mediate the communication. When a client-side component 561 needs to communicate with a server-side component 562, the client-side runtimes 510, server-side runtimes 540 and application server 530 mediate the communication.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more non-transitory, non-signal computer usable or computer readable storage medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for dynamically deploying an application in a client-server environment, comprising:
    creating a web application to run entirely on a web browser, said application comprising at least one application component and at least one abstract constraint, wherein application logic is independent of its placement on a server or a client and the at least one abstract constraint is expressed external to the application logic, wherein the at least one abstract constraint comprises a requirement of at least one of reliability, privacy, security, or trusted code for the at least one application component;
    evaluating a runtime context of the application in the client-server environment; and
    partitioning the placement and execution of the at least one application component dynamically at runtime so that implementation of the at least one abstract constraint is provided,
    wherein placement and execution of the at least one application component varies in different client-server environments,
    wherein the at least one application component comprises at least one computational component, at least one data component, or a combination of computational and data components,
    wherein the at least one computational component manipulates a state of the application and comprises validating forms, accessing a database, managing queries, calling services, conducting transactions, graphic transformations, image processing, calculations, spell checker, syntax highlighting, or interaction with user interface components, and
    wherein the at least one data component comprises a searchable collection of data or objects and comprises submitted orders; a database; a collection of image files, music files, or documents; or a file that needs to be stored persistently.

2. The method according to claim 1, comprising automatically partitioning the application into a client-side subset and a server-side subset according to the at least one abstract constraint.

3. The method according to claim 1, wherein said reliability constraint comprises that operations of the at least one application component operate as an atomic unit despite failures that occur as the operations execute.

4. The method according to claim 1, wherein the application supports cross-domain requests between applications running on at least one of different servers, different devices, or different networks by forcing the at least one application component to run on a server and to interact with a client web browser having a security restriction.

5. The method according to claim 1, wherein the at least one abstract constraint comprises a privacy requirement and the partitioning allows sensitive information to stay on a server.

6. The method according to claim 5, wherein the sensitive information comprises at least one of financial information or proprietary information.

7. The method according to claim 1, wherein the application comprises trusted code that is allowed to directly access a database and the at least one abstract constraint guarantees that the trusted code is not altered so that trusted code executes in a trusted environment.

8. The method according to claim 1, wherein the programming model allows for automated, just-in-time partitioning of the application based on client-side capabilities of individual users of the application.

9. The method according to claim 1, wherein the at least one constraint is not encoded in the at least one application component and implementation code for the at least one constraint is factored out of the application.

10. The method according to claim 1, wherein the at least one application component is placed on both a client and a server.

11. The method according to claim 1, wherein multiple sessions of the web application share the same at least one application component.

12. The method according to claim 1, wherein the reliability constraint guarantees delivery of messages of one application to another application if a system fails.

13. The method according to claim 1, wherein the at least one abstract constraint comprises a non-functional requirement specified by a developer.

14. The method according to claim 1, wherein the at least one abstract constraint comprises a requirement of at least one of privacy, security, or trusted code.

15. A computer program product, comprising:

a non-transitory, non-signal computer useable storage medium having a computer readable program, wherein the computer readable program when executed on a computer causes the computer to:

create a web application to run entirely on a web browser, said application comprising at least one application component and at least one abstract constraint, wherein application logic is independent of its placement on a server or a client and the at least one abstract constraint is expressed external to the application logic, wherein the at least one abstract constraint comprises a requirement of at least one of reliability, privacy, security, or trusted code for the at least one application component;

evaluate a runtime context of the application in the client-server environment; and partition the placement and execution of the at least one application component dynamically at runtime so that implementation of the at least one abstract constraint is provided, wherein placement and execution of the at least one application component varies in different client-server environments, wherein the at least one application component comprises at least one computational component, at least one data component, or a combination of computational and data components, wherein the at least one computational component manipulates a state of the application and comprises validating forms, accessing a database, managing queries, calling services, conducting transactions, graphic transformations, image processing, calculations, spell checker, syntax highlighting, or interaction with user interface components, and wherein the at least one data component comprises a searchable collection of data or objects and comprises submitted orders; a database; a collection of image files, music files, or documents; or a file that needs to be stored persistently.

* * * * *